United States Patent [19]
Ahlen

[11] 3,839,864
[45] Oct. 8, 1974

[54] HYDRODYNAMIC TORQUE CONVERTER INCLUDING A RELEASABLE TURBINE MEMBER

[75] Inventor: Karl Gustav Ahlen, Stockholm, Sweden

[73] Assignee: S.R.M. Hydromekanik AB, Stockholm, Sweden

[22] Filed: Apr. 6, 1973

[21] Appl. No.: 348,191

[30] Foreign Application Priority Data
June 26, 1972  Great Britain ................. 29919/72

[52] U.S. Cl. .............................. 60/349, 60/364
[51] Int. Cl. ........................................ F16h 41/14
[58] Field of Search ............ 60/337, 338, 341, 343, 60/345, 347, 349, 358, 364

[56] References Cited
UNITED STATES PATENTS
3,142,369  7/1964  Atkins ......................... 60/341 X
3,230,716  1/1966  Gabriel ........................... 60/343

FOREIGN PATENTS OR APPLICATIONS
806,184  12/1958  Great Britain ................. 60/347

Primary Examiner—Edgar W. Geoghegan
Attorney, Agent, or Firm—Larson, Taylor & Hinds

[57] ABSTRACT

A hydrodynamic torque converter having a rotating casing enclosing a work chamber which includes a turbine member, a reaction member and a pump member. At least one of the turbine member or a radial extension of the turbine output shaft but preferably the turbine member, is movable axially for engagement or disengagement with the other to thereby engage the turbine member to or release it from the turbine shaft. The turbine shaft extension may further engage the rotating casing for direct drive. Movement of the turbine member and/or the turbine shaft extension between the various operating positions is brought about by means of pressure differentials across these members, which members thereby serve as servo-piston elements.

47 Claims, 9 Drawing Figures

HYDRODYNAMIC TORQUE CONVERTER INCLUDING A RELEASABLE TURBINE MEMBER

BACKGROUND OF THE INVENTION

This invention relates to hydrodynamic torque converter transmissions of the type, wherein the torque converter has a rotating casing including a working chamber containing a pump member, a turbine member and a reaction member.

A torque converter of the type having a rotating casing, in order to cooperate with for instance synchromesh gears or forward/reverse dog clutch gears must have friction release possibilities between the driving source and the driven mechanism. Normally these release clutches are placed either in front of or behind the torque converter unit in the transmission. These clutch arrangements have also been mounted inside the rotating casing. In cases where the clutches have been mounted inside the rotating casing, they have been formed as complete servo-motor actuated clutches, with which it has been impossible to obtain a sufficiently complete release of the torque transfer from the primary side to the shaft of the driven part; and also the mass of the output part has been high. Further, such arrangements have been complicated due to the necessity of extra rotating connections for pressure oil to the servo-motor of the clutch. It has not been possible, with these designs, to reduce both the mass connected to the output shaft and the drag torque remaining when disconnected to allow cooperation with a synchromesh gear box for change of gears except with the further complication of enlarged synchronizers. The previously known arrangements with the clutch mounted within the rotating casing have been both complicated and expensive, and moreover, they have not operated sufficiently effectively. Examples of such devices are shown in the Jandasek U.S. Pat. No. 2,607,456 (a releaseable pump member) and the German Pat. No. 1,450,834 to Jean Maurice (a releasable turbine member). Therefore, until now the normal arrangement has been that the clutch has been a separate unit outside the torque converter on either the primary side or the secondary side of the transmission.

SUMMARY OF THE INVENTION

The main object of the present invention is to improve the design of the release arrangement through combined use of the feeder fluid system of the torque converter and of the bladed components to provide a torque converter of the kind mentioned, which is both simple in construction, which can be manufactured at a low price, and which, in spite of its simplicity, fulfills the requirement of reducing the drag torque when released and lessening the mass of the released output shaft to values which render the torque converter suitable for instance for direct connection to the normally existing synchromesh gear boxes, and at the same time as a coupling after release and gear change produced within a predetermined narrow limitation of torque and with extremely low wear of the friction surfaces. This low wear naturally also contributes to long and safe functioning even when the unit is roughly handled or used in a machine for heavy service with short intervals between connection and disconnection at high input speeds.

In my copending application Ser. No. 262,514, filed June 14, 1972, there is disclosed and claimed a torque converter of the rotating casing type which is formed with a releasable part, and in particular, a releasable pump member, and in which the pump member is utilized as a servo-piston to close or open one or more different friction couplings, depending on the direction of circulation of the feeder fluid of the torque converter.

According to one feature of the invention, in a torque converter transmission of the type referred to above, a pressure difference between pressure in a space formed by the turbine member and an extension of a turbine shaft and that in a space external to said members is utilized to engage a coupling device.

The invention also includes a hydrodynamic torque converter transmission of the type referred to above wherein the turbine member is used as a first element of a servo-motor to connect said turbine member to, or to disconnect the same from, a turbine shaft and wherein the turbine shaft or an extension thereof is used as a second element of a servo-motor to provide direct drive connection.

Further, the releasable pump member arrangement has a main feature in that, when connection is made, the pump member is connected to the primary mass, and therefore an unusually smooth increase of the torque on the secondary side is obtained when the circulation of the fluid in the circuit starts.

With the construction of the present invention the fluid rotates with the primary side, and when the mass of the turbine is connected to the turbine shaft in a faster manner, torque is applied by the fluid to the output shaft. This can be a desirable feature for certain types of applications such as where the horse power is large in relation to the mass of the vehicle, and the top speed is high. Also the device of the present invention is basically favorable for torque converters having only one turbine blade ring, while the releasable pump arrangement is favorable for so called high torque multiplication torque converters and moreover for torque converters having so-called double rotation possibilities.

The converter of the present invention allows frequent connection and disconnection without overheating or excessive wear, even if the engine should run at its maximum speed, and further, the remote control system is even simpler than for the releasable pump arrangement. A combination of a so-called 1½ stage torque converter and the present release clutch makes an extremely simple, effective and cheap torque converter transmission with large safety margins for misuse.

The arrangement according to the present invention, especially when applied to a 1½ stage torque converter cooperating with a synchromesh gear box, for instance for a passenger car, a delivery truck or the like, results in easy driving with few necessary shifts which increases driving safety on icy roads and increases the possibility of using engine braking. For another type of application, such as for instance a bull dozer, connection and disconnection can be made with the engine running at maximum speed, thus allowing simplification of the control of the unit and the obtaining of shortened working cycles without an increase in the engine power.

Thus, it is an object of this invention to provide a new and improved torque converter.

It is a further object of this invention to provide a new and improved torque converter having an improved arrangement for releasing the turbine member from the turbine output shaft.

It is still another object of this invention to provide a hydrodynamic torque converter having an improved arrangement for both releasing the turbine member from the turbine output shaft and also for connecting the rotating casing to the turbine output shaft for direct drive.

It is still another object of this invention to provide a hydrodynamic torque converter wherein engagement and release of a turbine member with respect to the turbine output shaft and/or engagement and release of the rotating casing with respect to the turbine output shaft for direct drive is provided by pressure differential causing axial movement of at least one of the turbine member and a radial extension on the turbine output shaft.

Other objects and the advantages of the present invention will become apparent from the detailed description to follow, together with the accompanying drawings.

BRIEF DESCRIPTION OF THE DRAWINGS:

The present invention will be hereinafter described by way of example with reference to the embodiment thereof shown in the accompanying drawings in which.

DETAILED DESCRIPTION OF THE PREFERRED EMBODIMENTS:

Referring now to the drawings, like elements represent like numerals throughout the several views.

Figure 1:
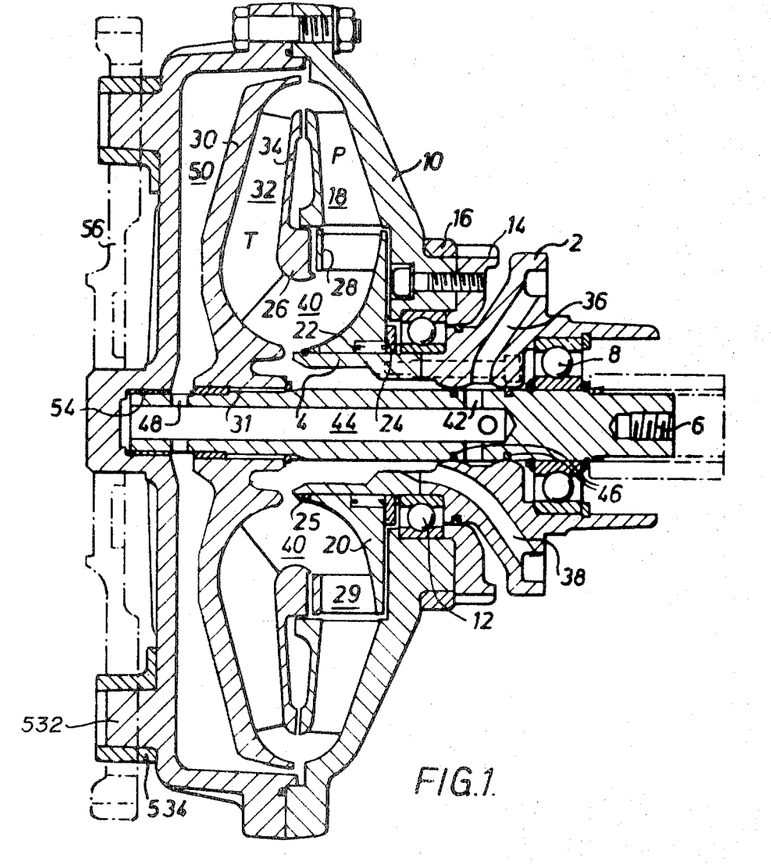
FIG. 1 shows a known type of torque converter, to which the invention may advantageously be applied, and showing also a new type of connection between the fly-wheel and the transmission and an arrangement of the blade system for different characteristics.

FIG. 1 shows a torque converter the interior working portions of which are of the known 1½ stage type which lends itself to the utilization of the arrangement of the present invention. In this figure, 2 is a stationary shaft to be bolted to a stationary casing. The stationary shaft 2 is extended to the left in the figure by a sleeve 4. A turbine shaft 6 is journalled in the stationary shaft 2 by means of a bearing 8, and the rotating casing 10 of the torque converter is journalled on the sleeve 4 by means of a bearing 12 and also in the fly-wheel 56.

The rotating casing has a gear 14 providing a drive connection for accessories and an annular lip seal 16. The rotating casing further carries a pump member having blades 18 and encloses guide or reaction member 20 which is mounted on a free-wheel 22, the latter being held in axial position on its right by a thrust ring 24 and on its left by a thrust ring 25. A turbine member 30 having blades 32 and an inner core ring 34 is mounted to the left of the pump inside the casing. The turbine member 30 is mounted on the shaft 6 by a spline connection 31.

The stationary shaft 2 is formed with channels 36 and 38 for hydraulic drive. The channel 38 inside the sleeve 4 is in direct connection with the working chamber 40 and the channel 36 communicates by apertures 42 with a bore 44 in the turbine shaft 6, the channel 36 being sealed between the stationary shaft 2 and the turbine shaft 6 by sealing rings 46.

The bore 44 communicates with the working chamber 40 through apertures 48 and through a space 50 between the rotating casing 10 and the turbine member 30, thus allowing circulation of fluid between channel 36 and channel 38. In this arrangement, fluid will normally enter through channel 38 and will be vented through channel 36. In the vent channel a maximum pressure valve should be arranged to ensure a basic pressure in the system. The turbine shaft 6 is at its front end journalled in the rotating casing by a bearing 54.

When the casing 10 rotates, the fluid within the chamber 40 is actuated by the pump blades 18 and is forced through the turbine blades 32 and corrected in direction by the guide vanes 29 on the member 20, which allows torque multiplication. In other words, torque conversion takes place and when the guide vanes free wheel it will have a coupling range when there is no negative torque on the guide vanes. However, the guide vanes may also be always held stationary in some forms of this torque converter.

Figure 5:
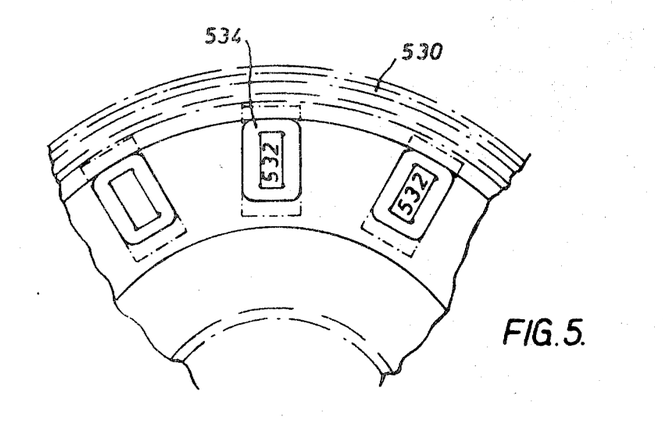
FIG. 5 is a partial view taken along line 5—5 of FIG. 2 and showing an arrangement of a resilient coupling used between the rotating casing of the torque converter and the prime mover.

The casing of the torque converter is connected to a fly-wheel 56 by slots formed radially in the fly-wheel, into which slots studs 532 of the casing 10 project. On each stud there is formed a layer 534 of elastic, rubber-like material 534. This arrangement is illustrated in FIGS. 1–3 and 5. Referring to FIG. 5, it will be seen that the rotating casing is self-centering relative to the fly-wheel because of the relationship between the studs 532 with their layers 534 and the slots in the fly-wheel. Each stud is prevented from moving circumferentially of the fly-wheel in its slot since the radial sides of layer 534 engage the radial sides of the slot. (Actually, the sides of each slot are not truly radial but are parallel to each other and are parallel to a radius through the center of the slot.) Further, the slots extend for a greater radial distance than the radial dimension of the studs 532 with their layers 534. Because of this structure, the casing is essentially self-centering on the fly-wheel. While at any given time, some studs might be permitted to move radially within their slots, at this same time, some other studs which are at right angles to the first said studs are prevented from such movement by engagement of the radial sides of the latter via layer 534 with the radial sides of their respective grooves. At the same time, because of the elastic material, there is a dampening of the torsional vibrations between the rotating casing and the driving source, which dampening is necessary in the released and direct drive positions. This structure is shown in greater detail in my U.S. application Ser. No. 367,376, filed June 6, 1973.

Figure 2:
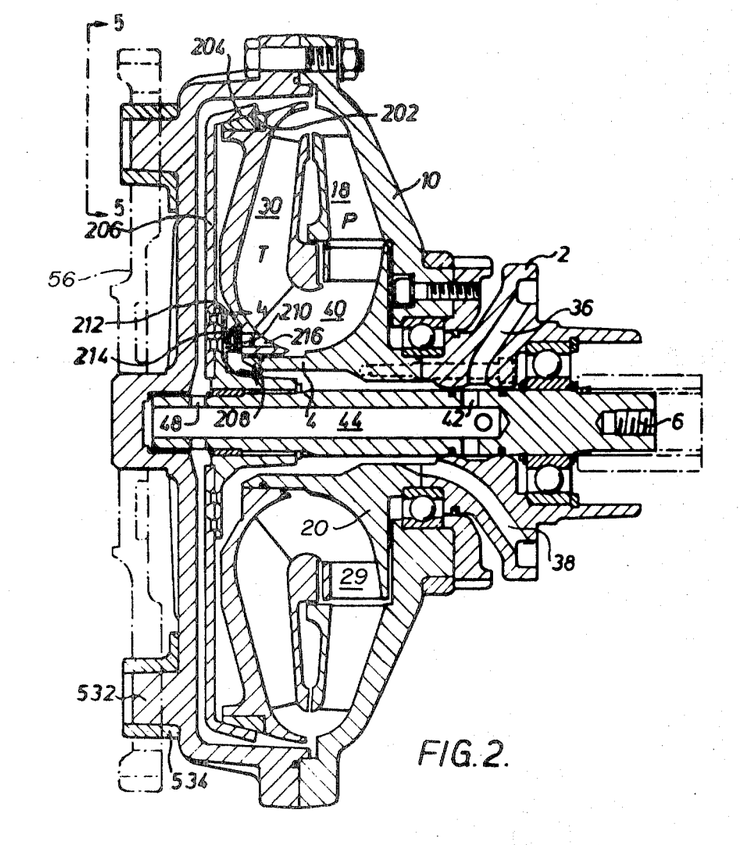
FIG. 2 shows the same type of torque converter as in FIG. 1, to which the invention is applied in the form of a releasable turbine arrangement, providing a possibility of practically completely eliminating the torque transfer or drag through the transmission, when the release arrangement is open.
Figure 4:
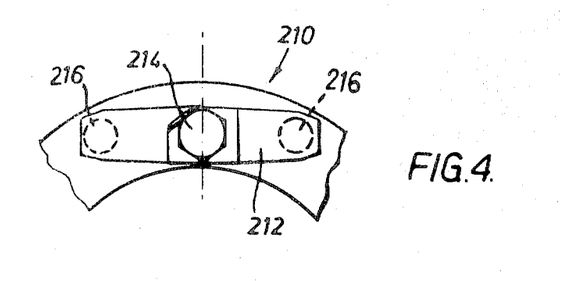
FIG. 4 is a partial view taken along line 4—4 of FIG. 2 and showing a simple form of a one-way maximum pressure valve applicable to the arrangements shown in FIGS. 2, 3 or 3a to obtain a pressure drop between the working chamber of the torque converter and the space between the turbine and a part of the turbine shaft forming the servo-motor.

FIG. 2 shows a torque converter of basically the same kind as shown in FIG. 1, to which the invention has been applied. The turbine member 30 may be released from the turbine shaft 6 or connected to said turbine shaft 6 by a friction clutch, consisting of element 202, which is a part of the turbine member 30 and another element 204, which is at the radially outer end of a radial extension 206 of the turbine shaft 6. Between the turbine member 30 and the extended part or sleeve 4 there is a ring seal 208. The turbine member 30 is also provided with a maximum pressure valve device 210 which, as best seen in FIG. 4, is formed with a blade spring 212 bolted to the turbine member 30 by a bolt 214 and which covers holes 216 in the turbine member 30.

When fluid enters through the channel 38 the turbine member 30 is automatically disconnected from the extension 206 of the turbine shaft 6 since the fluid has to pass between said two parts and through the friction coupling 202, 204 thereby urging the turbine member 30 to the right as shown in FIG. 2, in which case the coupling elements 202 and 204 are separated. In this case there is a very small or completely negligible torque absorption of the rotating casing, especially if the guide member 20 of FIg. 1 is on free-wheel, but also when the blades 29 have suitable shapes, with the guide member always stationary as in FIG. 2.

The torque transferred to the turbine shaft 6 both with a stationary guide member or a free-wheel guide member is extremely small, and also the moment of inertia of the turbine shaft 6 and its extension 206 is small even in relation to the clutch plates of a conventional, dry, friction coupling located outside the torque converter.

The paths of flow which produce the hydraulic drive or release conditions will be described below with respect to FIG. 6.

Figure 3:
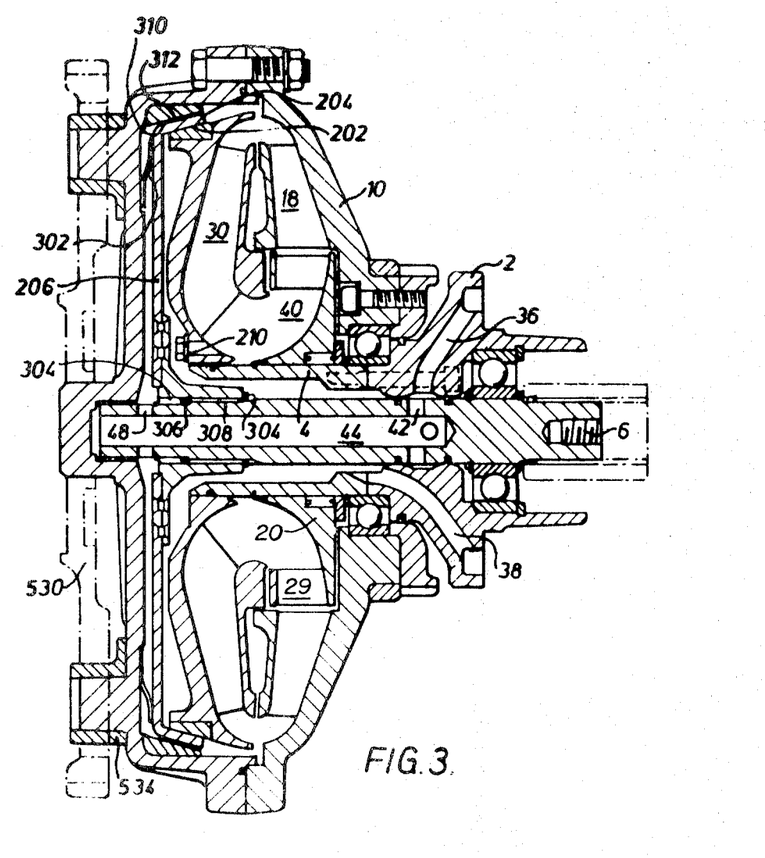
FIG. 3 shows the same arrangement as in FIG. 2 with additional means for establishing both hydraulic and direct connection between the input shaft and the output shaft.

FIG. 3 differs from FIG. 2 in two main respects. Firstly, the extension 206 of the turbine shaft 6 is constructed and arranged to allow a limited movement of at least the outer part thereof with respect to the turbine shaft. Extension 206 is held in position axially by thrust rings 304, and a movement of the outer part thereof is restrained by a spring element 302 or similar arrangement. The extension is sealed with respect to the turbine shaft 6 by an O-ring 306 and the extension 206 is rotationally fixed to the turbine shaft by a spline 308. Secondly, coupling surfaces 310 and 312 are provided also between the extension 206 and the rotating casing in addition to the coupling surfaces 202 and 204 between the extension 206 and the turbine member 30. As in the embodiment according to FIG. 2 the turbine member 30 is movable in relation to the rotating casing to connect or disconnect hydraulic drive.

As shown in FIG. 3, the guide member 20 is mounted by means of a free-wheel connection on the sleeve 4, which in turn is fixedly mounted on the stationary shaft 2. Due to this arrangement the guide member 20 is capable of rotating freely in one direction in relation to the stationary shaft 2. This may sometimes be necessary or advisable but it is not always necessary, even when the torque converter has a direct drive.

Figure 3A:
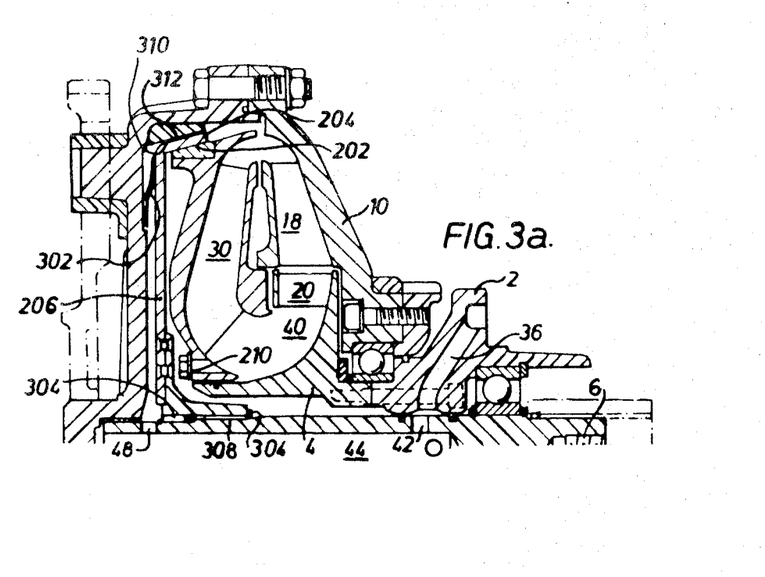
FIG. 3a is a fragmentary view of a modified embodiment of the torque converter shown in FIG. 3.

In the embodiment of the torque converter shown in FIG. 3a, the guide member 20 may be fixedly mounted on the sleeve 4 of the stationary shaft 2, and this embodiment of the invention may be used in connection with a blade system which is so shaped that at a relationship between the output speed $n_2$ and the input speed $n_1$ approximating to 1 there is a very small torque absorption. In this embodiment the guide member 20 is consequently stationary, in spite of the clutch between the rotating casing and the turbine shaft.

The manner of producing this particular characteristic of the torque converter at the same time as other favorable characteristics forms no part of the present invention.

In this embodiment of the invention only a small quantity of oil enters through the channel 38 when the drive line through the torque converter and the hydraulic drive is to be released. This oil then leaves through the channel 36 after passing between the turbine member 30 and the extension 206, between the friction surfaces 202 and 204 and then between the surfaces 310 and 312, through the holes or slots in the spring 302 and the openings 48, 44, and 42. When pressure fluid in larger quantities enters through the channel 36 this will pass through the openings 42, 44 and 48 and between the rotating casing 10 and the extension 206 of the turbine shaft 6, between the friction surfaces 310 and 312 and will enter the working chamber 40.

When entering the working chamber 40 the pressure fluid will initially try to escape between the coupling surfaces 202 and 204, but due to the restriction therebetween there will be a higher fluid pressure in the working chamber and behind the extension of the turbine, and hence the couplings 202 and 204 will close. The fluid then leaves through the maximum pressure valve 210 and out through the channel 38. By this arrangement of the fluid flow hydraulic drive is established as well as a circulation of the oil for cooling purposes.

If the direction of circulation is reversed, so that the fluid in said larger quantities enters through the channel 38 it will pass between the turbine member 30 and the turbine shaft extension 206 and will separate the coupling surfaces 202 and 204, whereupon the fluid tries to pass between the friction surfaces 310 and 312, where a pressure drop will be established which causes the said surfaces 310 and 312 to move into contact with each other, and the pressure in the working chamber 40 will establish a direct drive connection. In this position no circulation through the working chamber is necessary when direct drive is established. Therefore the maximum pressure valve may be on the oil pressure line connected to a 5-way valve used to direct the flow of oil, or otherwise a similar maximum pressure valve as shown in FIG. 4 may be utilized on the extension 206 of the turbine shaft 6 to maintain a predetermined closing force between the casing 10 and the turbine shaft extension 206. The three paths of flow which produce hydraulic drive, direct drive or a release of the torque transfer (allowing change of gear in case the turbine shaft is connected to a synchromesh transmission or for testing the engine or for any other reason) will be described in detail below with respect to FIG. 7.

If the torque converter is mounted on an engine, a driving connection is necessary between the rotating casing and the engine, which connection allows both centering and axial movements and misalignments, and which has good torsional vibration damping characteristics to avoid rattling, and which is simple and sufficiently cheap, thus requiring very little mounting work and very little machining. The connection between the fly-wheel and the rotating casing is made by means of radial grooves in the fly-wheel 530, shown in the axial direction in FIG. 5, in which there are studs 532 on the rotating casing, with the interposition of an elastic member 534 of a rubber like material, as described earlier with respect to FIG. 1.

Figure 6:
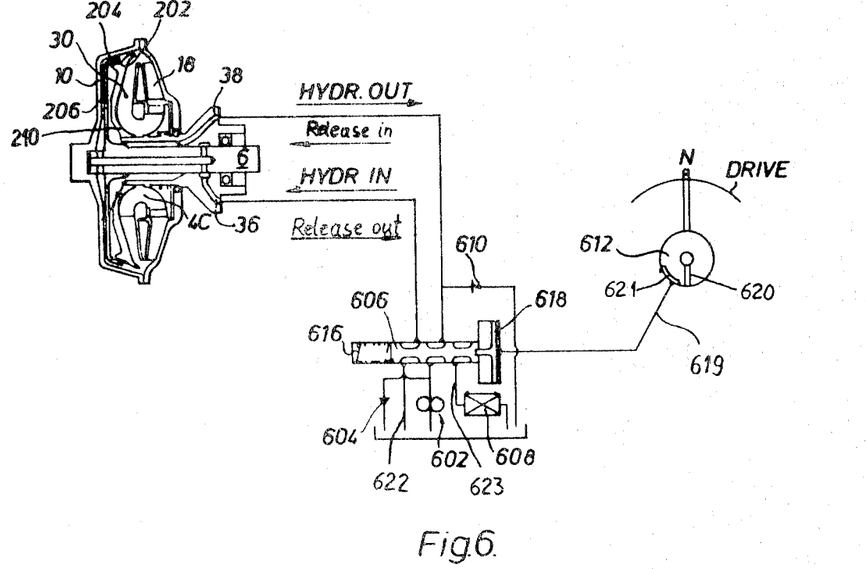
FIG. 6 schematically shows a torque converter transmission according to FIG. 2 provided with means for the actuation thereof and for controlling its operation.
Figures 7, 7A:
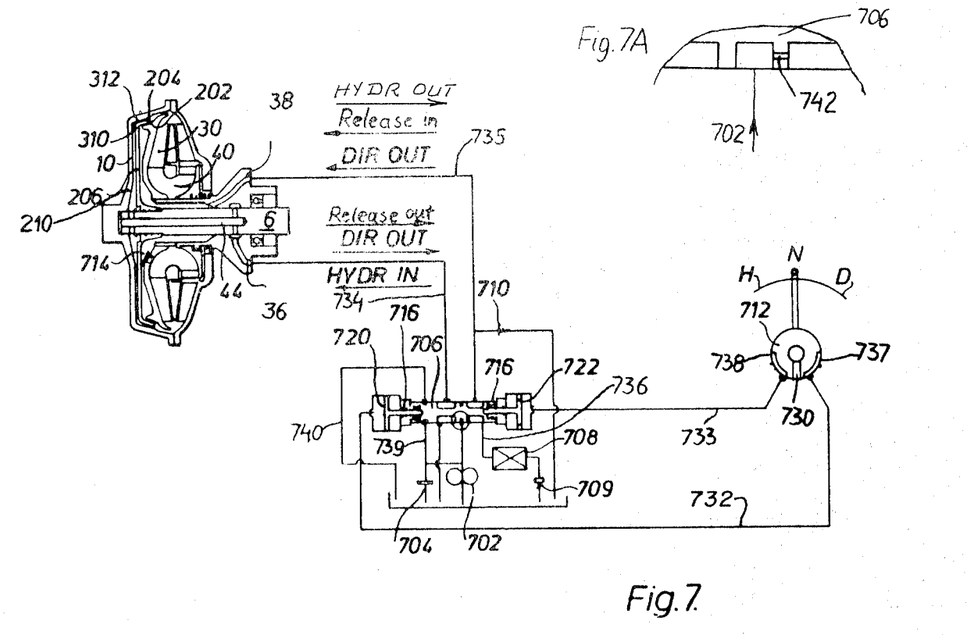
FIG. 7 schematically shows a torque converter transmission according to FIG. 3 provided with means for the actuation thereof and for controlling its operation.
FIG. 7A is an enlarged view of the circled portion of FIG. 7.

In FIGS. 6 and 7, the torque converters are reversed vertically from their FIGS. 2 and 3 positions in that the channel 38 appears at the upper half of the drawings and the channel 36 at the lower half.

FIG. 6 diagrammatically shows a remote control system for the torque converter transmission according to FIG. 2. The system comprises a feeder fluid pump 602, a maximum pressure valve 604, a 5-way valve 606, a heat exchanger 608 and a maximum pressure valve 610 limiting the pressure in the return pipe from the torque converter, and a remote control valve 612.

The valve 606 is normally kept in its right-hand position by the spring 616 but may be forced over to its left-hand position by an air servo-piston 618 by pressure fluid which is conveyed to piston 618 via line 619 from the remote control valve 612 in its drive position at which time pressure fluid from source passage 620 communicates with line 619. In the "Neutral" position pressure air is vented from the servo-piston 618 through the groove 621 of valve 612 and the fluid from the feeder pump 602 is connected to the pipe entering the system at the connection 38. However, from that pipe connection most of the oil will pass through the maximum pressure valve 610 opening at low pressure and feeding pressure fluid directly back to the sump to minimize losses. In this position the pressure oil enters between the turbine member 30 and the turbine shaft extension 206 releasing the turbine from the turbine shaft and returns to the sump through the channel 36 and the pipe to the valve which is open to let the oil return via line 622 to the sump.

If the remote control valve 612 is moved over from "Neutral" to "Drive," the piston 618 forces the valve rod of the 5-way valve 606 to its left-hand position, whereby pressure fluid is conveyed from the pump 602 and the connecting pipe to the channel 36 of the torque converter, from which the fluid passes through the openings 42, 44, 48 in the turbine shaft and between the rotating casing 10 and the turbine shaft extension 206 into the working chamber 40. Due to the restriction in the flow between the surfaces 202 and 204 the oil passes by said surfaces and into the working chamber 40 whereby the turbine member 30 is moved to the left thereby closing the cone clutch surfaces 202 and 204. To reach the channel 38 the fluid now must pass through the maximum pressure valve 210 which ensures a predetermined pressure difference between the chamber formed by the turbine member 30 and the turbine shaft extension 206, of which the friction surface 204 is a part, and the area external to that chamber and the said pressure difference causes a frictional connection acting so that the turbine member 30 rotates together with the turbine shaft 6. The oil then returns to the 5-way valve 606 and passes through said valve to a pipe 623 connected to a radiator or heat exchanger 608 and from the heat exchanger back to the sump.

In accordance with the present invention the full capacity of the feeder fluid is used to connect or disconnect the drive of the torque converter, and hence the connection is very fast, and due to the fact that the maximum pressure valve 210 is located in the turbine member 30, which in turn is a piston part of the servo-motor producing connection, it is impossible to get a pressure shock as the valve has a very small mass and will open instantaneously to fulfil its function of producing maximum pressure difference on the two sides of the said piston part. Further, when the clutch is released by changing the direction of circulation of the fluid, the total capacity of the feeder fluid circulation will pass through the two friction clutch surfaces 202 and 204, which in turn makes it possible to connect and disconnect hydraulic drive with very short intervals, even if the primary side, i.e., the pump member 18, is rotating at full speed. In that case also, no pressure shock will occur since the connection of the turbine member 30 to the turbine shaft 6 will initiate circulation of fluid in the working chamber 40, and only when the circulation of fluid reaches its normal condition for the speed in question will full secondary torque be delivered through the turbine shaft 6, and therefore there is no risk of connection shocks, but the pick-up of full torque is very fast, as the fluid before the connection was circulating with the primary side of the converter.

When the turbine member 30 is released, minimum torque is carried over to the turbine shaft extension 206 which is another feature of this invention. As stated before, the turbine shaft 6 and the extension 206 thereof have a relatively small mass of inertia, and therefore a transmission of this kind can be directly connected to a normal synchromesh gear box without an intermediate release clutch without abnormal wear of the synchronizers, and further because the number of shifts of the complementary box will be minimized due to the effect of the torque converter.

A torque converter according to the invention may also be used for instance on a power shovel allowing the engine to run constantly at maximum speed, whereby the mass of inertia of the engine can be utilized in part for acceleration of the vehicle, due to the fact that the clutch 202, 204 practically only has to do the work of synchronizing the turbine member 30 with the turbine shaft 6, and because immediately on disengaging the clutch the clutch surfaces will be cooled by a considerable amount of circulation fluid, thus permitting a high frequency of engagement.

FIG. 7 shows a remote control system for a torque converter of the kind described in connection with FIG. 3 and having a feeder fluid pump 702, a maximum pressure valve 704, a 5-way valve 706, a heat exchanger 708, a maximum pressure valve 710 limiting the pressure in the return pipe from the torque converter, a maximum pressure valve 709 in circuit after the radiator or heat exchanger 708, and a remote control valve 712.

The remote control valve 712 has three positions, one for hydraulic drive, one for neutral and one for direct drive. The 5-way valve 706 has pre-stressed spring elements 716 holding the valve in its middle position for neutral, which position is assumed when the valve is non-actuated, as illustrated in FIG. 7. The valve 706 is further provided with the two servo-pistons 720, 722, which can move the valve rod in the valve 706 to the left-hand or a right-hand position. The piston 720 is so connected to the remote control valve 712 that pressurized air is conveyed to the servo-piston 720 when the valve 712 is moved into position for hydraulic drive via pressure source 730 and line 732. If on the other hand the remote control valve 712 is in position for direct drive pressurized air is conveyed from 730 to the servo-piston 722 via line 733, thereby causing the valve rod to move to its left-hand position.

When the valve rod is in the right-hand position due to the valve 712 having been moved to hydraulic position, the feeder fluid pump 702 is connected via line 734 to the entrance channel 36 of the torque converter thereby directing a flow of fluid through the bore 44 of the turbine shaft to the space between the extension 206 of the turbine shaft 6 and the rotating casing 10 and further between the friction clutch surfaces 310 and 312, which are kept apart by the pressure drop when oil is passing between these two surfaces. Oil then enters into the working chamber 40 of the torque converter, whereby the pressurized oil will move the turbine member 30 towards the turbine shaft extension 206 so that the passage between the surfaces 202 and 204 is closed. When the pressurized oil has fulfilled its function of engaging the friction clutch surfaces 202 and 204, it opens the passage through the maximum pressure valve 210 and returns to the sump through the outlet channel 38 of the torque converter and via line 735 to the 5-way valve 706 which directs fluid to a pipe connection 736 to the radiator or heat exchanger 708 whereupon the oil passes through a low pressure/maximum pressure valve 709 ensuring a definite pressure in the radiator and back to the sump. As the oil enters between the casing 10 and the extension of the clutch 206 and has to pass between the clutch surfaces 310 and 312, it holds the extension in its right-hand position in relation to the turbine shaft 6, which is the correct working position for the working of the turbine. If the remote control valve 712 is turned to neutral, the valve rod of the 5-way valve 706 is moved back to its middle position by the springs 716 at the same time as the piston 720 is vented through the groove 737 of remote control valve 712, and no air pressure exists in the piston 722, which is vented through groove 738 of the valve 712. In this position, a path 739 is provided for connecting the feeder fluid pump 702 through the valve 706 via line 740 to the sump to lower the oil pressure. There is, however, also a restricted passage 742 (see FIG. 7A) from the feeder fluid pump to the channel 38 in the torque converter via line 735, and in said pipe connection 735 there is a maximum pressure valve 710 limiting the possible pressure therein.

A limited quantity of fluid will pass between the turbine member 30 and the turbine shaft extension 206 and between the friction surfaces 202 and 204. The fluid will then pass between the surfaces 310 and 312 but as the quantity of fluid is small it will not move the turbine shaft extension 206 to produce contact between the surfaces 310 and 312 but will leave the transmission through the turbine shaft 6 and the channel 36. The small flow through the torque converter is established by means of the small hole 742 in the valve 706 directing the said small quantity of oil to the channel 38 of the torque converter. This passage of the small oil quantity together with the spring element 302 shown in FIG. 3 — which spring has holes or slots in it, permitting the small quantity of oil to pass — assures that the turbine member 30 is kept in the release position so that the turbine shaft 6 is held free from the rotating casing.

When the remote control valve 712 is moved to position for direct drive, the servo-piston 722 is energized via pressurized fluid from 730 into line 733 and this forces the valve rod of valve 706 over to its left-hand position. In this position, the feeder fluid pump 702 is connected to the pipe 735 leading to the entrance channel 38 of the torque converter, and at the same time the passage of fluid to the heat exchanger 708 is closed and, also at the same time, the vent opening from the pump 702 through the valve 706 and via line 740 to the sump, is closed.

The oil now enters the torque converter between the turbine member 30 and the turbine shaft extension 206 in full quantity and thereby separates the turbine member 30 and the turbine shaft extension 206 to a maximum and passes between the surfaces 202 and 204 building up a pressure in the working chamber 40 and in the space between the turbine member 30 and the turbine shaft extension 206, from which space the fluid cannot leave except between the surfaces 310 and 312.

The pressure drop between the surfaces 310 and 312 however prevents the fluid passing between said surfaces, and the pressurized fluid moves the turbine shaft extension 206 into contact with the rotating casing 10 thereby closing the passage 310, 312. The pipe connection 735 between the valve 706 and the channel 38 in the torque converter is formed with a maximum pressure valve 710, which now opens to form a direct drain for the feeder fluid, since in the direct drive connection no circulation of fluid is necessary. A small quantity of oil will however leak through the seal formed by the surfaces 310 and 312, and this oil will leave through the turbine shaft and through the channel 36 back to the sump. This passage also ensures low pressure between the turbine shaft extension 206 and the rotating casing 10. In this way, the direct connection of the turbine shaft 6 to the rotating casing 10 is established.

The friction linings between the turbine member 30 and the extension 206, i.e., the surfaces 202 and 204, are preferably of a type having a high friction coefficient, and this is possible because the connection of the turbine 30 having a small mass to the turbine shaft 6 is not sufficient to provide a shock which can be felt in the vehicle, not even in spite of the oil acceleration in the torque converter. For connection of direct drive it is however desirable to have a smooth connection and to permit the use of the same cone angle for the two clutches. The friction lining material on the surfaces 310 and 312 should therefore have a lower frictional coefficient and should preferably comprise a material having a small difference between kinetic and brake-away friction coefficients, and this mainly because the cone clutch for direct drive should be able to slip on torque shock to save the turbine shaft 6 from fatigue stress. On connection of direct drive it is a feature that the complete working chamber 40 of the torque converter is working at a damping capacity and it may be preferable to have a 1- way maximum pressure valve also in the disc element of the turbine shaft extension 206 to assure that only the intended maximum pressure difference is reached between the chambers on opposite sides of the said extension 206.

It is intended that it will be possible to use the lubrication oil system of the engine for the torque converter at least for small truck applications and that the engine cooling system will then take care of the dissipation of the power loss in the torque converter, which means that for certain simplified applications it will be necessary to use only a manually operated valve for oil distribution, which will thereby provide maximum simplicity.

A main feature of the torque converter according to the present invention is not only simplicity and low production costs of the torque converter, but also the fact that such simplicity is attained simultaneously with high safety margins for correct operation.

The servo-motors provided for connection and disconnection of the hydraulic drive and direct drive operate with high fluid quantities making even large leakages unimportant and large or complicated maximum pressure valve unnecessary. Further, the high fluid circulation utilized for effecting the connections makes the connection times very short. Due to the fact that the converter cooling fluid passes between the friction surfaces of the clutches, the said clutches may undergo frequent engagements and disengagements without risk of overheating. Moreover, it has become apparent that the sealing elements inside of the torque converter are only slightly dependent on the static or dynamic eccentricity of the connection to the prime mover. Thus a converter according to this invention can be manufactured at a low price and is easy to handle and safe to operate and will, nevertheless, fulfil requirements which previously could not be fulfilled even by more complicated torque converters in combination with external clutches.

Although the invention has been described in considerable detail with respect to preferred embodiments thereof, it will be apparent that the invention is capable of numerous modifications and variations apparent to those skilled in the art without departing from the spirit and scope of the invention.

I claim:

1. A torque converter of the type having a rotating casing enclosing a working chamber having therein a pump member including at least one ring of pump blades, a reaction member including at least one ring of guide blades and a turbine member including one or more rings of turbine blades, and a turbine shaft which comprises the output of the torque converter, said turbine member forming the sole fluid force transmitting means within the working chamber for transferring fluid forces to the turbine shaft, said turbine shaft including a radial extension completely free of fluid force transmitting blades and fixedly connected to the turbine shaft for rotation therewith, at least one of said turbine member and said turbine shaft extension being a movable member movable axially towards and away from the other, such that the turbine member and the said extension are relatively movable between at least a first position in which the turbine member is connected to the said turbine shaft extension for rotation with the turbine shaft and a second position in which all of said blades of the turbine member are completely released from the turbine shaft extension to rotate in relation to the turbine shaft such that no fluid forces are transferred by the turbine member to the turbine shaft.

2. A torque converter according to claim 1, including means for creating a fluid pressure differential on opposite sides of said movable member, the axial movements of said movable member being responsive to said pressure differential for movement between said first and second positions.

3. A torque converter according to claim 2, wherein the said extension is located on the side of the turbine member opposite from the working chamber.

4. A torque converter according to claim 3, wherein the turbine member is the movable member and including a maximum pressure valve in the turbine member to determine the magnitude of the said pressure differential across the turbine member.

5. A torque converter according to claim 3, including a friction clutch arranged to engage the turbine member with the said turbine shaft extension, said friction clutch forming a seal to seal the space between the turbine member and the extension.

6. A torque converter according to claim 5, wherein said friction clutch is a cone clutch.

7. A torque converter according to claim 6, wherein one part of the cone clutch is formed on the radially outermost portion of the said extension, and the other part of the cone clutch is formed on the radial outermost portion of the turbine member.

8. A torque converter according to claim 7, including a first passageway in the torque converter leading to the working chamber containing the pump, turbine and reaction members, and a second passageway in the torque converter leading to a space between the turbine shaft extension and the turbine member, the connection of the turbine member to the turbine shaft being effected by conveying fluid into the working chamber through the first passageway and venting the space between the turbine shaft extension and the turbine member through the second passageway, and release of the turbine member from the turbine shaft being effected by oppositely directing the flow of fluid in said first and second passageways.

9. A torque converter according to claim 8, wherein the torque converter includes a feeder fluid pump, valve means directing fluid either to the first passageway to the working chamber or to the second passageway to the space between the turbine shaft extension and the turbine member and venting the other passageway, said valve means including at least one maximum pressure valve downstream from the feeder fluid pump between the space formed by the turbine member and the turbine shaft extension and the working chamber and at least one maximum pressure valve in a line leading to and from the working chamber of the torque converter.

10. A torque converter according to claim 2, including means for directing pressurized fluid through the transmission to one side of said movable member for causing a pressure differential in one direction to engage the turbine member with the turbine shaft extension, and means for reversing the direction of flow through the torque converter to direct the pressurized fluid to the opposite side of the movable member to release the turbine member and the turbine shaft extension.

11. A torque converter according to claim 10, including a maximum pressure valve permitting fluid of a predetermined pressure to flow through the movable member in either direction while maintaining the existing pressure differential.

12. A torque converter according to claim 1, wherein each of said pump, reaction and turbine members includes only one blade ring thereon.

13. A torque converter according to claim 12, wherein the reaction member ring is mounted on a free-wheel allowing the reaction member to rotate freely in one direction.

14. A torque converter according to claim 13, wherein the reaction member is fixedly mounted on a stationary part of the torque converter, the blading system being formed so as to allow connection of the rotating casing to the turbine shaft without abnormal direct drive losses.

15. A torque converter according to claim 1, including a driving source member drivingly engaged with the said rotating casing, said engagement including studs on one member projecting into radial slots in the other member, and including a layer of elastic material surrounding said studs and contacting both the studs and the sides of said slots.

16. A torque converter according to claim 1, wherein the space between the turbine member and the said turbine shaft extension forms a first chamber, and including means responsive to a pressure differential between the chamber and the area surrounding the chamber for moving the said movable member between said first and second positions.

17. A torque converter according to claim 16, said movable member being the turbine member, and including a friction clutch formed by facing surfaces on the turbine member and the turbine shaft extension, which clutch is engaged in the said first position.

18. A torque converter according to claim 17, wherein said friction clutch is a cone clutch.

19. A torque converter according to claim 1, including a maximum pressure valve across the movable member for fluid circulation during the said first position.

20. A torque converter according to claim 19, said maximum pressure valve being located in the radial inner portion of the movable member.

21. A torque converter according to claim 1, including a direct drive means for drivingly engaging the rotating casing with the turbine shaft for direct drive.

22. A torque converter according to claim 21, wherein said direct drive means includes means for drivingly engaging the rotating casing with the said turbine shaft extension for direct drive from the rotating casing through the turbine shaft extension to the turbine shaft.

23. A torque converter according to claim 22, wherein the turbine member and the turbine shaft extension constitute first and second elements of a servo-motor, respectively, and means for creating a pressure differential on opposite sides of the turbine member for establishing said first position, and said direct drive means including a means for creating a pressure differential across the turbine shaft extension for engaging the turbine shaft extension with the rotating casing in said direct drive position.

24. A torque converter according to claim 23, including a first clutch having frictional surfaces arranged to contact each other to engage the turbine member and the turbine shaft extension in said first position.

25. A torque converter according to claim 24, said clutch being a cone clutch.

26. A torque converter according to claim 24, wherein at least the radially outermost portion of the torque converter is axially movable towards and away from the rotating casing, and including a further clutch having frictional surfaces arranged to contact each other to engage the turbine shaft with the rotating casing for direct drive.

27. A torque converter according to claim 26, wherein the said further clutch is a cone clutch.

28. A torque converter according to claim 26, including a maximum pressure valve in at least one of said servo-motor elements to establish the magnitude of the pressure differential thereacross.

29. A torque converter according to claim 26, wherein the said frictional surfaces of the first clutch are formed on facing surfaces of the turbine member and the turbine shaft extension, and the said frictional surfaces of the second clutch are formed on facing surfaces of the turbine shaft extension and the rotating casing.

30. A torque converter according to claim 29, wherein the first clutch is constructed to act as a seal to enclose the space between the turbine member and the turbine shaft extension, and the second clutch is constructed to act as a seal to enclose the space between the turbine shaft extension and the rotating casing.

31. A torque converter according to claim 26, wherein the turbine member is the movable member which moves between the first and second positions, and including a spring means resisting the said outward part of the turbine shaft extension towards the rotating casing.

32. A torque converter according to claim 26, including a first passageway in the torque converter leading to the space between the turbine shaft extension and the rotating casing and a second passageway leading to a space between the turbine shaft extension and the turbine member, and including means for conveying fluid to and from the said passageways in the following manner: (a) into the said second passageway at a reduced pressure and venting said fluid through the first passageway for releasing both of said friction clutches, (b) introducing pressurized fluid at a pressure substantially higher than said reduced pressure into said second passageway for engaging said further clutch to establish direct drive between the rotating casing and the turbine shaft extension, and (c) introducing pressurized fluid through said first passageway and venting said fluid through said second passageway for engaging the first said friction clutch between the turbine shaft extension and the turbine member in said first position.

33. A torque converter according to claim 32, including an adjustable multi-way valve movable to one position to open a vent for pressurized fluid from a source, to establish a vent from the space between the turbine shaft extension and the casing and simultaneously to provide a restricted connection to the space between the said extension, and the turbine member, said valve being movable to a second position to convey pressurized fluid from the supply source to the space between the said turbine shaft extension and the rotating casing, said fluid then passing through a maximum pressure valve and being vented through said valve, and said valve further being movable to a third position to control the supply of pressurized fluid to the space between said turbine shaft extension and the turbine member and to vent the space between said turbine shaft extension and the rotating casing, and including a remote control device for adjusting the position of said multiway valve.

34. A torque converter according to claim 26, wherein both of said frictional clutches are cone clutches, the said frictional surfaces of the first clutch being formed on the facing surfaces of the turbine member and the turbine shaft extension, and the frictional surfaces of the second clutch being formed on the facing surfaces of the turbine shaft extension and the rotating casing, both of said cone clutches having substantially the same conical angle, and the friction surfaces of the said further friction clutch having a lower coefficient of friction than the surfaces of the first said friction clutch.

35. A torque converter according to claim 1, including a friction clutch arranged to engage the turbine member with the turbine shaft extension, said friction clutch forming a seal to seal the space between the turbine member and the extension.

36. A torque converter according to claim 35, said friction clutch being a cone clutch.

37. A torque converter comprising: a rotating casing including in a working chamber a pump member, a turbine member and a reaction member, a turbine shaft comprising the torque converter output, said turbine member forming the sole fluid force transmitting means within the working chamber for transferring fluid forces to the turbine shaft, said turbine shaft having a radial extension completely free of fluid force transmitting blades and fixedly connected to the turbine shaft for rotation therewith, said turbine shaft extension and said turbine member forming a space therebetween, and including means for creating a pressure differential between said space and the area surrounding said space, and means responsive to said pressure differential for engaging and disengaging a coupling device of the torque converter to respectively drivingly engage the turbine member and the turbine shaft and to completely disengage the turbine member and the turbine shaft such that no fluid forces are transferred by the turbine member to the turbine shaft, said coupling including at least one of said turbine member or turbine shaft extension.

38. A torque converter according to claim 37, wherein said coupling includes means for connecting the turbine member to the turbine shaft extension.

39. A torque converter according to claim 32, wherein the said coupling includes means for connecting the turbine shaft extension to the rotating casing.

40. A torque converter of the type having a rotating casing forming therein a working chamber having therein a pump member including at least one ring of pump blades, a reaction member including at least one ring of guide blades and a turbine member including one or more rings of turbine blades, and a turbine shaft which comprises the output of the torque converter, said turbine member forming the sole fluid force transmitting means within the working chamber for transferring fluid forces to the turbine shaft, said turbine shaft including a radial extension completely free of fluid force transmitting blades and fixedly connected to the turbine shaft for rotation therewith, at least one of said turbine member and said turbine shaft extension being a movable member movable axially towards and away from the other to respectively engage a coupling to drivingly connect the turbine member and the said extension together or release the coupling to completely release the turbine member from the turbine shaft extension for rotation in relation to the turbine shaft such that no fluid forces are transferred by the turbine member to the turbine shaft, said coupling consisting of surfaces to be engaged and disengaged with each other by means of a servo-motor, which servo-motor includes said movable member.

41. A torque converter according to claim 40, wherein the turbine member is the movable member and constitutes the moving part of the servo-motor.

42. A torque converter according to claim 41, in which the coupling for operatively connecting the turbine member and the turbine shaft extension is a friction coupling.

43. A torque converter according to claim 41, in which the said coupling consists of only two surfaces.

44. A torque converter according to claim 43, in which the coupling surfaces are carried by the said turbine member and the said turbine shaft extension.

45. A torque converter according to claim 44, wherein the coupling surfaces are friction surfaces.

46. A torque converter according to claim 40, including a direct drive means for drivingly engaging the rotating casing with the turbine shaft extension for direct drive, and wherein both said turbine member and said turbine shaft extension are movable members of the servo-motor, the turbine shaft extension being movable into and out of engagement with the casing for engaging and disengaging the direct drive, and the turbine member being movable into and out of engagement with the turbine shaft extension for engaging and disengaging the hydraulic drive of the torque converter.

47. A torque converter according to claim 46, including means for delivering pressurized fluid into the space between the turbine shaft extension and the casing and out from the space between the turbine shaft extension and the turbine member, and for reversing the flow to deliver pressurized fluid into the space between the turbine shaft extension and the turbine member and out through the space between the turbine shaft extension and the casing.

* * * * *